US012584592B2

(12) United States Patent (10) Patent No.: US 12,584,592 B2
Rebernik (45) Date of Patent: Mar. 24, 2026

(54) SYSTEM FOR CHECKING THE FUNCTIONALITY OF A PRESSURE RELIEF VALVE

(71) Applicants:Cryoshelter LH2 GmbH, Dobl-Zwaring (AT); Cryoshelter BioLNG GmbH, Dobl-Zwaring (AT)

(72) Inventor: Matthias Rebernik, Dobl-Zwaring (AT)

(73) Assignees: Cryoshelter LH2 GmbH, Dobl-Zwaring (AT); Cryoshelter BioLNG GmbH, Dobl-Zwaring (AT)

( * ) Notice: Subject to any disclaimer, the term of this patent is extended or adjusted under 35 U.S.C. 154(b) by 283 days.

(21) Appl. No.: 18/552,352

(22) PCT Filed: Mar. 30, 2022

(86) PCT No.: PCT/AT2022/060098
§ 371 (c)(1),
(2) Date: Sep. 25, 2023

(87) PCT Pub. No.: WO2022/204745
PCT Pub. Date: Oct. 6, 2022

(65) Prior Publication Data
US 2024/0052978 A1 Feb. 15, 2024

(30) Foreign Application Priority Data
Apr. 1, 2021 (AT) .......................... GM 50063/2021

(51) Int. Cl.
F17C 13/04 (2006.01)
B60K 15/03 (2006.01)
F16K 37/00 (2006.01)

(52) U.S. Cl.
CPC ........ F17C 13/04 (2013.01); B60K 15/03006 (2013.01); F16K 37/0083 (2013.01);
(Continued)

(58) Field of Classification Search
CPC ................ F17C 13/04; F17C 2201/056; F17C 2203/0391; F17C 2203/0629;
(Continued)

(56) References Cited

U.S. PATENT DOCUMENTS 2,178,901 A * 11/1939 Webster ................. F16K 17/04
73/1.72
4,428,223 A * 1/1984 Trevisan ............. F16K 37/0083
73/1.72
4,548,067 A 10/1985 Cox
4,682,495 A * 7/1987 McNeely ............ F16K 37/0091
137/488
(Continued)

FOREIGN PATENT DOCUMENTS

CN 107726039 A 2/2018
DE 102019125184 A1 3/2021
(Continued)

OTHER PUBLICATIONS

International Search Report, mailed May 30, 2022, from PCT/AT2022/060098, 6 pages.

*Primary Examiner* — Freddie Kirkland, III

(74) *Attorney, Agent, or Firm* — Workman Nydegger

(57) ABSTRACT

A system including a cryogenic container for storing cryogenic fluid and a connection system having a connection line connected to the cryogenic container and ending in a pressure relief valve, and there is provided a check valve within the connection line, which is configured to prevent a flow of fluid in the direction of the cryogenic container, and the system further comprises a test line, which connects to the connection line between the check valve and the pressure relief valve and ends in a test connection for a test device for providing a pressurized test fluid, and there is provided a valve within the test line, which is configured to prevent a flow of fluid in the direction of the test connection and to enable a flow of fluid in the direction of the pressure relief valve in order check the functionality thereof.

11 Claims, 3 Drawing Sheets

(52) U.S. Cl.
CPC .............. *B60K 2015/03026* (2013.01); *F17C 2201/056* (2013.01); *F17C 2203/0391* (2013.01); *F17C 2203/0629* (2013.01); *F17C 2205/0332* (2013.01); *F17C 2205/0335* (2013.01); *F17C 2205/0352* (2013.01); *F17C 2205/0385* (2013.01); *F17C 2205/0388* (2013.01); *F17C 2221/012* (2013.01); *F17C 2221/033* (2013.01); *F17C 2223/0161* (2013.01); *F17C 2223/043* (2013.01); *F17C 2260/021* (2013.01); *F17C 2270/0168* (2013.01)

(58) Field of Classification Search
CPC ...... F17C 2205/0332; F17C 2205/0335; F17C 2205/0352; F17C 2205/0385; F17C 2205/0388; F17C 2221/012; F17C 2221/033; F17C 2223/0161; F17C 2223/043; F17C 2260/021; F17C 2270/0168; F17C 2223/033; F17C 2260/015; F17C 2260/042; F17C 2270/0184; F17C 13/123; B60K 15/03006; B60K 2015/03026; F16K 37/0083; A47C 21/006
See application file for complete search history.

(56)  References Cited

U.S. PATENT DOCUMENTS

| | | | | |
|---|---|---|---|---|
| 5,571,231 | A * | 11/1996 | Lee | F25J 1/0274 |
| | | | | 62/48.2 |
| 8,695,357 | B2 * | 4/2014 | Brook | F02M 21/0221 |
| | | | | 62/50.2 |
| 10,168,003 | B2 * | 1/2019 | Sundqvist | F17C 13/04 |
| 10,400,712 | B2 * | 9/2019 | Garner | F17C 13/02 |
| 12,092,267 | B2 * | 9/2024 | Rebernik | F17C 13/04 |
| 2006/0130925 | A1 * | 6/2006 | Bourgeois | F17C 5/007 |
| | | | | 141/82 |
| 2008/0134693 | A1 * | 6/2008 | Harper | F17C 1/12 |
| | | | | 62/50.7 |
| 2011/0297273 | A1 * | 12/2011 | Kempen | F17C 9/00 |
| | | | | 141/94 |
| 2018/0023766 | A1 * | 1/2018 | Sundqvist | F17C 13/04 |
| | | | | 137/625.28 |
| 2020/0149683 | A1 | 5/2020 | Kreutzer et al. | |
| 2022/0290810 | A1 * | 9/2022 | Rebernik | F17C 13/04 |
| 2023/0167948 | A1 * | 6/2023 | Rebernik | F17C 13/025 |
| | | | | 62/45.1 |
| 2024/0353283 | A1 * | 10/2024 | Jung | G01M 3/2876 |

FOREIGN PATENT DOCUMENTS

| | | |
|---|---|---|
| EP | 3262334 B1 | 1/2018 |
| KR | 200321348 Y1 | 7/2003 |
| KR | 101067234 B1 | 9/2011 |

* cited by examiner

SYSTEM FOR CHECKING THE FUNCTIONALITY OF A PRESSURE RELIEF VALVE

The invention relates to a system comprising a cryogenic container for storing cryogenic fluid and a connection system having at least one connection line connected to the cryogenic container and ending in a pressure relief valve, wherein there is provided a check valve within the connection line, which is configured to prevent a flow of fluid in the direction of the cryogenic container.

According to prior art, liquefied gases may be stored in containers ("cryogenic containers"), to store these as a fuel for, e.g., an engine. Cryogenic containers store gases in a deep-cold and liquefied status. Gases such as, e.g., methane or hydrogen in their liquefied status have a density that is 600 times up to 800 times higher than in the standard status (ambient temperature and pressure). This increase in density is useful for liquefication and, at the same time, poses a risk when securing cryogenic containers, as the complete heating of a full cryogenic container and, hence, the evaporation of the liquefied gas would lead to pressures of higher than 1,000 bar up to 2,000 bar. Such pressures would more than exceed the mechanic durability of the cryogenic container by far, in any case.

The "maximum allowable working pressure", MAWP, of, for example, 16 bar gauge is then, hence, protected by a first pressure relief valve—1.PRV such that this pressure will never be exceeded in operation. As an additional safety measure—in case of a malfunction of the $1^{st}$ PRV— there is provided a second pressure relief valve ($2^{nd}$ PRV), which is only triggered at a higher pressure than the P t PRV, e.g. at 22 bar gauge. Both pressure relief valves must be in constant connection with the internal tank and must not be separated from the internal tank by any valves without replacement—a filled internal tank should be protected by two pressure relief valves at all times.

The tank wall thicknesses and design principles required for this purpose, as well as the ratio of first pressure and second pressure, are specified in various standards, e.g. ISO 21029. Basically, the standards have in common that the MAWP may in principle be reached as often as desired, while the pressure of the $2^{nd}$ PRV should only be reached once or a few times, respectively, for checking immediately after the internal tank has been manufactured.

The pressure relief valves therefore constitute the central safety device for cryogenic containers and their function must be checked on a regular basis. As a rule, the container is emptied for this purpose and the valves are dismantled and checked for themselves as components, or new pressure relief valves are fitted.

Emptying a tank is time-consuming and the contents cannot be used further without complex equipment and are therefore lost. The associated costs are considerable. The aim of the invention thus is to enable a check when the tank is full. A check of the $1^{st}$ PRV would also be possible with a full tank by natural pressure increase or by active pressure increase from the outside in the entire tank, since the internal tank is adapted for this pressure. Checking the $2^{nd}$ PRV, on the other hand, would require at least a temporary deactivation of the $1^{st}$ PRV, on the one hand, and at the same time a pressure increase in the tank to a pressure of above the MAWP. Even if only temporarily deactivating one of the pressure relief valves is critical to safety. The repeated increase of the pressure above the MAWP is at odds to the intentions of the design criteria of the pressure container standards and therefore to be avoided. These two reasons speak against checking both pressure relief valves when the tank is filled.

One solution approach would be to adapt the pressure container in such a way that the pressure of the $2^{nd}$ PRV plus a certain test tolerance would still lie within the MAWP of the internal tank. By way of the above examples, this would mean: Design MAWP is e.g. 24 bars, but for operation the tank will still be protected with a $1^{st}$ PRV at 16 bar gauge and a $2^{nd}$ PRV at 22 bar gauge. This configuration would at least allow the pressure within the tank to be increased several times to up to 22 bar gauge in order to check the $2^{nd}$ PRV. The problem of a temporary deactivation of the $1^{st}$ PRV would still be to be solved convincingly. However, a significant disadvantage of this solution approach is the additional internal tank wall thickness that is required as a result of the increased MAWP and which, for the tank geometries and pressures on which the examples are based, means an approx. 60% increase in the material used for the internal tank.

An alternative solution for checking the pressure relief valves is known, for example, from EP 3 262 334 B1, in which two pressure relief valves are switched in parallel. By means of a rotating mechanism, the container connection may be connected either to both pressure relief valves or only to one of the pressure relief valves. If one of the pressure relief valves is to be replaced, the rotary mechanism may therefore be set in such a way that only one of the pressure relief valves is connected to the container connection so that the other pressure relief valve may be replaced. The removed pressure relief valve may then be tested in an external test device.

However, such methods with two interchangeable pressure relief valves also have disadvantages. For example, the mechanism requires a complicated switching system to ensure that one pressure relief valve may only be removed when the other pressure relief valve is connected to the cryogenic container. Moreover, the development of this invention is based on the finding that with the two pressure relief valves switched in parallel, it is not possible to check all sources of error, such as the correct seating of the pressure relief valve in its connection.

From U.S. Pat. No. 4,548,067 there is known a valve connection component for pressure relief valves of regular, i.e. non-insulated, pressure containers and pipelines. However, this valve connection component is not suitable for the use with cryogenic containers as the valve connection component must be mounted directly onto the pressure container or pipeline, respectively, which does not seem possible with cryogenic containers due to the insulation. Also, the test valve assembly of U.S. Pat. No. 4,548,067 comprises fluorocarbon sealing rings, which are not suitable for cryogenic temperatures.

It is, therefore, the task of the invention to provide an improved system for checking pressure relief valves for cryogenic containers.

This task is solved by a system comprising a cryogenic container for storing cryogenic fluid and a connection system having at least one connection line connected to the cryogenic container and ending in a pressure relief valve, wherein there is provided a check valve within the connection line, which is configured to prevent a flow of fluid in the direction of the cryogenic container, wherein the system further comprises a test line, which connects to the connection line between the check valve and the pressure relief valve and which ends in a test connection for a test device for providing a pressurized test fluid, wherein there is provided a valve within the test line, which is configured to prevent a flow of fluid in the direction of the test connection and to enable the flow of fluid in the direction of the pressure relief valve in order to check the functionality thereof.

According to the invention, a check valve opening towards the pressure relief valve is arranged between the pressure relief valve and the tank, and a test connection is arranged between this check valve and the pressure relief valve. This test connection allows a test line to be connected while the tank is under pressure. The test connection may therefore itself be configured, for example, as a check valve opening towards the pressure relief valve with a screw cap on the atmosphere side.

In this way, the triggering at set pressure of both the $1^{st}$ PRV and the $2^{nd}$ PRV may be checked while the tank is filled and without increasing the pressure in the tank itself, thus achieving significant time and cost savings both of the container itself and also in its operation.

The system according to the invention enables an optimal combination of the advantages known from prior art. On the one hand, the pressure relief valve may be checked directly in its mounted state on the cryogenic container and, in particular, does not have to be removed for checking. Thus, for example, the correct seating of the pressure relief valve in its connection may also be taken into account in the test method of the pressure relief valve.

A special feature of the system according to the invention is in particular that the pressure relief valve does not have to be removed for testing, whereby the excess pressure required for the test method does not, however, have to be provided by increasing the pressure in the cryogenic container. By permanently providing the test connection, a test device such as a pump or pressurized gas cylinder may be connected to the test connection at any time and the functionality of the pressure relief valve may be checked without have to increase the excess pressure in the cryogenic container and without having to remove the pressure relief valve. Furthermore, the test device may use test fluid such as air or inert gas such as nitrogen to test the pressure relief valve, eliminating the need to waste cryogenic fluid from the cryogenic container for test trials.

It is particularly preferred if the valve is a check valve or a pinch valve. The check valve has the advantage that it opens automatically as soon as pressure is applied to the test connection. The pinch valve has the advantage that the test connection and the valve may be combined in one component and the valve only opens when a suitable test device for opening the pinch valve is connected. For example, a pinch valve is understood to be a valve that automatically opens when a connection of the test device is inserted into it and automatically closes when the test device port is removed from it. Both the check valve and the pinch valve have tremendous safety advantages in cryogenic fluid applications, as leakage of cryogenic fluid is reliably prevented by the use of this type of valve, even in the event of erroneous or negligent operation. Alternatively, the valve could be a manual valve, although this is less preferred as manual operation always entails safety concerns. For example, a manual valve could be left open, or unintentionally not fully closed, which brings a great risk, especially if the cryogenic fluid is hydrogen. The manual valve, however, has the advantage that the test process may be better regulated and, for example, may also be stopped manually.

Furthermore, it is preferred if the trigger pressure of the pressure relief valve is above the maximum allowable working pressure of the cryogenic container or above the maximum operating pressure of the cryogenic container.

This is preferred because such pressure relief valves usually could not or should not be checked by increasing the pressure in the cryogenic container.

In a further preferred embodiment, a further connection line is connected to the first-mentioned connection line or routed into the cryogenic container, whereby the further connection line ends in a second pressure relief valve, which is triggered at a different triggering pressure than the first-mentioned pressure relief valve. This provides a backup in the event that one of the pressure relief valves fails to operate. If the further connection line is connected to the connection line first mentioned, this has the further advantage that only one line needs to be routed through the cryogenic container, wherein both pressure relief valves may still be checked during operation. This advantage is specific to cryogenic containers, as each connection of a line to the cryogenic container will be associated with a loss of insulation quality. Thus, there is no duplication of the connection line with pressure relief valve mentioned at the beginning, but rather a synergy effect, since two pressure relief valves may be checked during operation with only one connection point to the cryogenic container. This would not be possible in a system such as that described in EP 3 262 334 B1, as one connection point to the cryogenic container is required here for each pressure relief valve.

The second pressure relief valve may be checked in two ways. In the first variant, a second check valve may provided in the further connection line, which is configured to prevent a flow of fluid in the direction of the cryogenic container, and the system may further comprise a further test line, which connects to the further connection line between the further check valve and the second pressure relief valve and ends in a further test connection for the test device or a further test device for providing the test fluid mentioned or a further pressurized test fluid, wherein there is provided a further valve that is provided in the further test line, which is configured to prevent a flow of fluid in the direction of the further test connection and to enable the flow of fluid in the direction of the second pressure relief valve to check the functionality thereof. In the second variant, the test line may also connect to the further connection line or the further connection line may connect to the connection line first mentioned between the check valve and the first pressure relief valve. Both possibilities for checking may be carried out according to the invention without having to increase the pressure in the cryogenic container itself.

Furthermore, the connection line between a connection point to the cryogenic container and the check valve is at least in part, preferably completely, configured as a pipeline. This means that the valves do not have to be located directly next to the cryogenic container or that the valves may be arranged at a point that is remote from the passage through the cryogenic container, respectively. This is in particular advantageous for cryogenic containers or an arrangement on a vehicle, respectively, as the valves may be decoupled from the cryogenic container, which results in thermal advantages and reduced vibration transmission during travel.

Preferably, the cryogenic container has an internal tank and an external container, whereby the external container completely surrounds the internal tank at a distance and a vacuum insulation is produced between the external container and the internal tank, whereby the connection line passes through both the internal tank and the external container. Such cryogenic containers are particularly suitable for the storage of cryogenic fluid, in particular cryogenic containers on vehicles.

In a preferred embodiment, the invention thus relates to a vehicle with a cryogenic container in one of the aforementioned embodiments, which is further preferably mounted on a vehicle frame of the vehicle.

In a further aspect, the invention relates to a method for checking the functionality of the pressure relief valve in a system of the embodiments mentioned above, wherein the test device is connected to the test connection and applies test fluid onto the test line at a test pressure, which may in particular be above a pressure in the cryogenic container. This method has the advantages explained at the beginning for the system.

It is particularly advantageous in the method mentioned above if the test device applies the test fluid to the connection line at an increasing, preferably steadily increasing, pressure and if the pressure, at which the pressure relief valve is triggered, is recorded. In this way, there may be exactly determined at which pressure the pressure relief valve will trigger. Alternatively, only the pressure to be tested just above and/or just below the expected triggering pressure, i.e. a nominal triggering pressure of the pressure relief valve, could be applied to the connection line in order to check the functionality.

Advantageous and non-limiting embodiments of the invention are explained in greater detail below by ways of the drawings.

Figure 1:
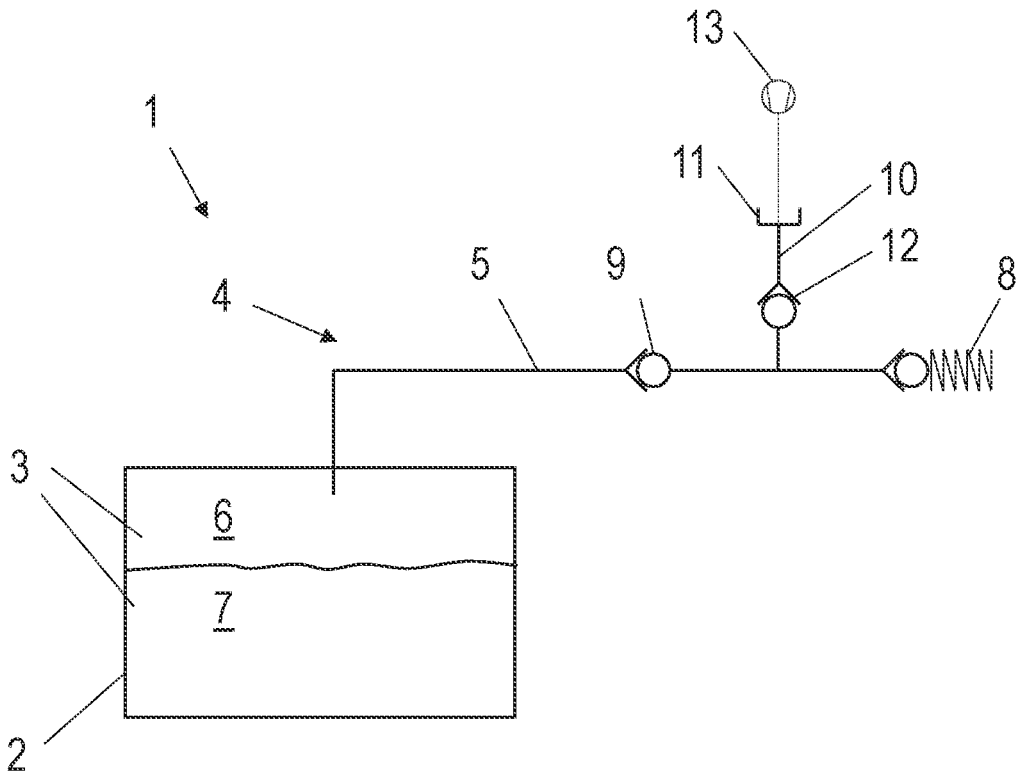
FIG. 1 shows a system according to the invention for checking the functionality of a pressure relief valve.

FIG. 1 shows a system 1 comprising a cryogenic container 2 for storing cryogenic fluid 3. The cryogenic container 2 of this system 1 may, for example, be mounted on a vehicle not further shown, wherein the cryogenic fluid 3 stored in the cryogenic container 2 may be used as fuel for the vehicle and may, for example, be supplied to an engine. In other embodiments, however, the cryogenic container could also be provided for other applications.

For example, the cryogenic fluid stored in the cryogenic container 2 may be hydrogen, such that the cryogenic container 2 is a hydrogen container, or the cryogenic fluid may be LNG (Liquefied Natural Gas), such that the cryogenic container 2 is an LNG container. Depending on the cryogenic fluid, the cryogenic container 2 is thus adapted to store cryogenic fluid at temperatures of, for example, below 150 Kelvin, or even below 50 Kelvin in the case of hydrogen, or below 30 Kelvin, or substantially 20 Kelvin. Depending on the application, the cryogenic container 2 could, for example, be configured for storing sLH2 (sub-cooled liquid hydrogen) or CcH2 (cryo-compressed hydrogen) and thus also be adapted for corresponding high pressures, e.g. for maximum pressures between 5 bar and 350 bar.

FIG. 1 also shows a connection system 4 connected to the cryogenic container 2. The connection system 4 is, for example, a withdrawal system, via which cryogenic fluid 3 is withdrawn from the cryogenic container 2 and supplied to the aforementioned engine, for example. However, it could also be another connection system 4 to the cryogenic container 2, for example a filling system, a vent system for manual venting of the cryogenic container 2 or a dedicated safety system.

The connection system 4 has a connection line 5, which preferably withdraws cryogenic fluid 3 in gas phase 6 from the cryogenic container 2. For this purpose, the connection line 5 may, for example, be connected to an upper third of the cryogenic container 2, as seen in the operating condition of the cryogenic container 2. However, it is also possible that the connection line 5 withdraws cryogenic fluid 3 in liquid phase 7, and for example an evaporator is arranged in the connection line 5.

The connection line 5 of the connection system 4 ends in a pressure relief valve 8 and has a check valve 9 between the connection point to the cryogenic container 2 and the pressure relief valve 8. The check valve 9 allows a flow of fluid from the cryogenic container 2 to the pressure relief valve 8, but not from the pressure relief valve 8 to the cryogenic container 2, i.e. it prevents a flow of fluid in the direction of the cryogenic container 2.

The pressure relief valve 8 will block a flow of fluid if the pressure in the connection line 5 is below a threshold value and will open if the pressure in the connection line 5 exceeds the threshold value. In this way, the pressure relief valve 8 assumes an extremely critical safety role, because it prevents the pressure in the cryogenic container 2 from becoming too high and the cryogenic container 2 from being damaged as a result. The threshold value mentioned of the pressure relief valve 8 is, for example, at a so-called maximum allowable working pressure ("MAWP") of the cryogenic container 2 and depends on the characteristics of the cryogenic container 2. This maximum allowable working pressure is usually 16 bar, such that the pressure relief valve 8 may be configured to open at a pressure of 16 bar. As a rule, however, the threshold value of the pressure relief valve 8 may be selected as desired and may be made dependent on the external circumstances or the intended use, respectively.

Since this pressure relief valve 8 is so critical for the safety of the system 1, it should be checked at regular intervals. Herein there is proposed to leave the pressure relief valve 8 installed in the connection system 4 for the test method and to provide a test line 10, which is connected to the connection line 5 between the check valve 9 and the pressure relief valve 8. For this purpose, the connection point in the connection line 5 between the check valve 9 and the pressure relief valve 8 may, for example, have a simple T-piece.

The test line 10 ends in a test connection 11, which in general may be of any configuration and may, for example, be closed using a blind screw connection in the operating condition, i.e. when the pressure relief valve 8 is not to be tested.

In-between the test connection 11 and the connection point to the connection line 5, the test line 10 has a valve 12, which is, for example, a check valve as shown. Alternatively, the valve 12 may also be a pinch valve, which also cannot be actuated manually, but rather by inserting or applying a connection of the test device. In yet other embodiments, the valve 12 could also be a manually operable manual valve or any other valve that may prevent a flow of fluid in the direction of the test connection 11 and enable a flow of fluid in the direction of the pressure relief valve 8. The test connection 11 and the valve may have a separate configuration, as is shown. Alternatively, the two components may be combined into one component, particularly if the valve 12 is a pinch valve and must receive a counterpart passing through the test connection 11 to open.

The method for checking the functionality of the pressure relief valve 8 may now be carried out as follows. A test device 13 for providing a pressurized test fluid, for example a pump or pressurized gas bottle, is initially connected to the test connection 11. For example, there may be installed a flexible tube from the test device 13 to the test connection 11. Test fluid is then applied to the test line 10 at a predetermined test pressure, for example above a pressure in the cryogenic container 2. At the same time, the pressure relief valve 8 is observed and it may be determined whether it triggers and releases test fluid. Checking whether the pressure relief valve 8 is triggered may be carried out either visually or by means of a pressure gauge in the test line 10, in the connection line 5 between the check valve 9 and the pressure relief valve 8 or in the test device 13. If the pressure indicated by the pressure gauge suddenly drops or remains constant despite a desired pressure increase by the test device 13, respectively, this indicates that the pressure relief valve 8 has been triggered. Opening may also be detected on the atmospheric side of the pressure relief valve 8, for example by attaching a balloon or applying a leak test foam.

The test fluid pressurized by the test device 13 may be, for example, air, e.g. filtered or unfiltered ambient air, a fluid having a similar or the same chemical composition as the cryogenic fluid 3 that is stored in the cryogenic container 2, or an inert gas such as nitrogen.

The pressure applied by the test device 13 may be either a predetermined constant pressure, for example within the range of the nominal triggering pressure, or the threshold value of the pressure relief valve 8, or an increasing pressure, for example a constant or incrementally increasing pressure. An increasing pressure makes it possible to exactly determine at which pressure the pressure relief valve 8 will trigger.

Figure 2:
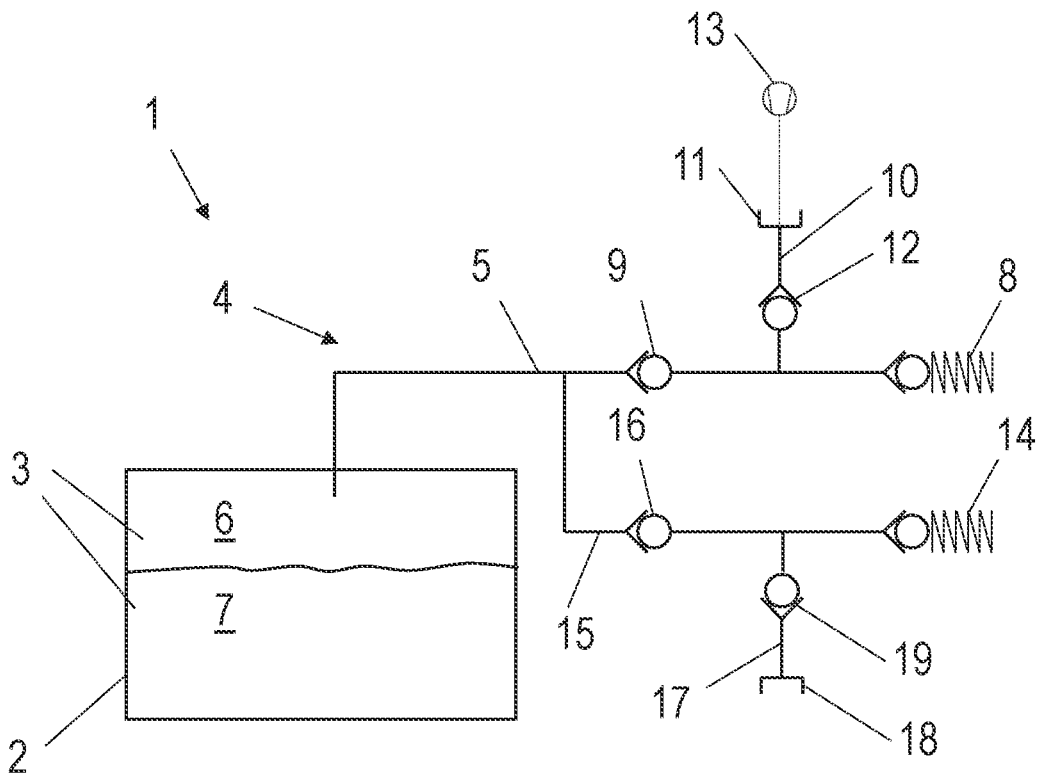
FIG. 2 shows a system according to the invention for checking the functionality of two pressure relief valves with wide test connections.

FIG. 2 shows that due to the importance of the safety function of the pressure relief valve 8, there may be provided to arrange a second pressure relief valve 14 in the system 1, which preferably triggers at a different threshold value than the pressure relief valve 8 first mentioned. It is usually provided that the first pressure relief valve 8 triggers at a maximum allowable working pressure, for example 16 bar, and the second pressure relief valve 14 triggers at a pressure, which is just below a pressure at which damage to the cryogenic container 2 is expected, for example 22 bar, wherein this pressure may optionally be specified by a standard. The threshold value of the second pressure relief valve 14 is thus above the threshold value of the first pressure relief valve 8, and thus above the maximum allowable working pressure, for example.

For this purpose, there is provided a further connection line 15, which ends in the second pressure relief valve 14. The connection line 15 may connect to the first-mentioned connection line 5 as shown, for example between the connection point to the cryogenic container 2 and the check valve 9 first mentioned, between the check valve 9 and the connection point of the test line 10 or between the connection point of the test line 10 and the first pressure relief valve 9. Alternatively, the further connection line 15 could be routed directly into the cryogenic container 2. The further connection line 15 may have a check valve 16, which is configured to allow a flow of fluid in the direction of the second pressure relief valve 14 and to prevent a flow of fluid in the direction of the cryogenic container 2. There may be provided a further test line 17, which is connected to the further connection line 15 between the further check valve 16 and the second pressure relief valve 14. The further test line 17 ends in a further test connection 18 and a further valve 19 is arranged in the test line 17. The further valve 19 is configured to prevent a flow of fluid in the direction of the further test connection 18 and to allow a flow of fluid in the direction of the second pressure relief valve 14.

Figure 3:
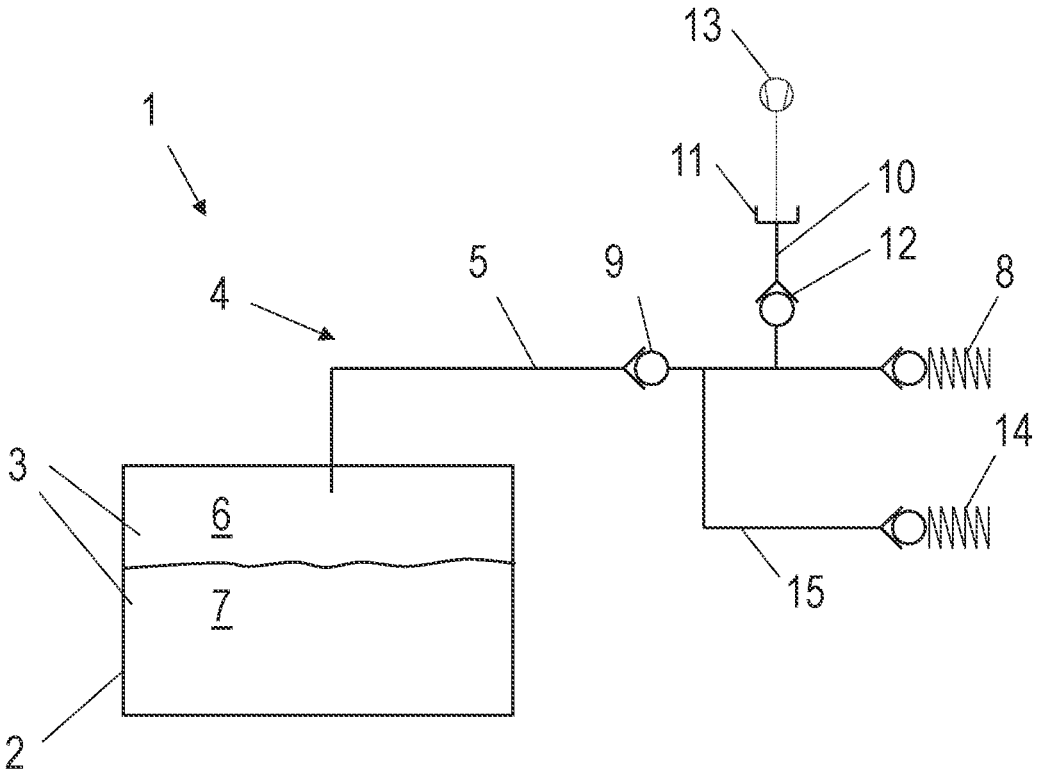
FIG. 3 shows a system according to the invention for checking the functionality of two pressure relief valves with one test connection.

Furthermore, as shown in FIG. 3, it would be possible not to provide a further test line 17 or a further test connection 18, respectively, and to connect the further connection line 15 directly between the check valve 9 and the first pressure relief valve 8 to the connection line 5. Since both pressure relief valves 8, 14 are now connected to a single test line 10, both pressure relief valves 8, 14 may be checked simultaneously, although they will open at different pressures. For this purpose, the pressure and the flow rate are further increased after the first pressure relief valve 8 has been opened until the second pressure relief valve 14 also opens, i.e. both pressure relief valves 8, 14 are open at the same time. The respective triggering pressure may be determined either by the supply pressure curve, supply mass flow, supply volume flow, for example at the respective balloons. This arrangement eliminates the need for one test connection. This may be provided analogously in the embodiment of FIG. 2 if no further test line 17 or no further test connection 18, respectively, is provided and the further connection line 15 is connected to the connection line 5 between the connection point to the cryogenic container 2 and the check valve 9. In this way, the test line 10 is connected both between the first pressure relief valve 8 and the check valve 9 to the connection line 5 and between the second pressure relief valve 14 and the further check valve 16 to the further connection line 15, whereby a simultaneous check of both pressure relief valves 8, 9 may be carried out.

For the components 15-20 and the test method for the second pressure relief valve 14, all embodiment variants may be used as described above for the first pressure relief valve 8. This means that the two pressure relief valves 8, 14 may be checked separately and independently of each other, but also simultaneously if necessary, without having to dismantle one of the pressure relief valves 8, 14.

In order to configure the cryogenic container 2 for cryogenic temperatures (e.g. temperatures below 150 Kelvin), the cryogenic container 2 may comprise an internal tank and an external container, wherein the external container completely surrounds the internal tank at a distance and a vacuum insulation is provided between the external container and the internal tank. Such a construction usually prevents valves or the like from being mounted directly on the cryogenic container 2 or the external container, respectively, as relative movements between the internal tank and the external container caused by thermal changes may occur. Especially when the cryogenic container 2 is mounted on a vehicle, it is not possible to screw valves directly onto the cryogenic container 2 because the available installation space is very limited. For these reasons, between a connection point to the cryogenic container 2 and the non-return valve, the connection line is at least in part, preferably completely, configured as a pipeline, i.e. as a rigid or flexible pipe having a cylindrical cross-section and a length of, for example, at least 5 cm, at least 10 cm or at least 20 cm. The pipeline may, for example, be routed from the connection point to the cryogenic container 2 to a connection block, in which the further lines, in particular the lines between the valves 8, 9 and 12, are implemented by means of bores or the like. This connection block could have connection openings for inserting the valves 8, 9 and 12 (possibly also 14, 16, 19). Alternatively, pipes could also be provided between all valves 8, 9 and 12 (if necessary also 14, 16, 19) and the connection point to the cryogenic container 2.

Furthermore, if a connection block is used, it is preferred if the pressure relief valve 8, 14 is at least partially realized in the connection block. The pressure relief valve 8, 14 usually consists of a valve body, a spring element and the valve head, which is biased against the valve body by means of the spring element and discharges fluid when a predetermined excess pressure is reached. Usually, the valve body is screwed onto a pipeline or the like. Preferably, however, the valve body is configured as part of the connection block, i.e. only the spring element and the valve head are mounted on the connection block to form the pressure relief valve. If the connection block comprises, for example, a connection opening for a pipeline to connect to the cryogenic container or an internal T-piece to connect the test pipe and/or connections for valves 9, 12, 16, 19, there may be developed a particularly compact unit.

The invention claimed is:

1. A system comprising a cryogenic container for storing cryogenic fluid and a connection system having a connection line connected to the cryogenic container and ending in a pressure relief valve, wherein there is provided a check valve within the connection line, which is configured to prevent a flow of fluid in the direction of the cryogenic container, and the system further comprises a test line, which connects to the connection line between the check valve and the pressure relief valve and ends in a test connection for a test device for providing a pressurized test fluid, wherein there is provided a valve within the test line, which is configured to prevent a flow of fluid in the direction of the test connection and to enable a flow of fluid in the direction of the pressure relief valve in order to check the functionality thereof, wherein the valve is a check valve or a pinch valve.

2. The system according to claim 1, wherein a triggering pressure of the pressure relief valve is above the maximum allowable operating pressure of the cryogenic container.

3. The system according to claim 1, wherein there is connected a further connection line to the connection line first mentioned, wherein the further connection line ends in a second pressure relief valve, which will trigger at a different triggering pressure than the pressure relief valve.

4. The system according to claim 3, wherein there is provided a second check valve in the further connection line, which is configured to prevent a flow of fluid in the direction of the cryogenic container, wherein the system further comprises a further test line, which connects to the further connection line between the further check valve and the second pressure relief valve and ends in a further test connection for the test device or a further test device for providing the pressurized test fluid or a further pressurized test fluid, wherein there is provided a further valve within the further test line, which is configured to prevent a flow of fluid in the direction of the further test connection and to enable a flow of fluid in the direction of the second pressure relief valve in order to check the functionality thereof.

5. The system according to claim 3, wherein the test line also connects to the further connection line or the further connection line between the check valve and the pressure relief valve first mentioned to the connection line first mentioned.

6. The system according to claim 1, wherein the connection line is configured between a connection point at the cryogenic container and the check valve at least in part as a pipeline.

7. The system according to claim 1, wherein the cryogenic container has an internal tank and an external container, wherein the external container completely surrounds the internal tank at a distance and there is provided vacuum insulation between the external container and the internal tank, wherein the connection line penetrates the internal tank as well as the external container.

8. A vehicle, comprising a system according to claim 1, wherein the cryogenic container is mounted on a frame of the vehicle.

9. A method for checking the functionality of the pressure relief valve in a system according to claim 1, the method comprising the step of connecting the test device to the test connection and applying test fluid having a test pressure onto the test line.

10. The method according to claim 9, the method comprising the steps of applying the test fluid with an increasing pressure onto the connection line by the test device and recording the pressure, at which the pressure relief valve triggers.

11. The method according to claim 9, wherein the test fluid comprises an inert gas.

\* \* \* \* \*